United States Patent
Kim et al.

(10) Patent No.: US 10,951,439 B2
(45) Date of Patent: Mar. 16, 2021

(54) WIRELESS COMMUNICATION DEVICE AND CHANNEL ESTIMATING METHOD THEREOF

(71) Applicant: SAMSUNG ELECTRONICS CO., LTD., Suwon-si (KR)

(72) Inventors: Jinho Kim, Suwon-si (KR); Gyoungil Kwak, Suwon-si (KR); Inhyoung Kim, Suwon-si (KR); Sebin Im, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/747,051

(22) Filed: Jan. 20, 2020

(65) Prior Publication Data
US 2020/0274740 A1    Aug. 27, 2020

(30) Foreign Application Priority Data

Feb. 25, 2019   (KR) .................... 10-2019-0021950
May 29, 2019   (KR) .................... 10-2019-0063310

(51) Int. Cl.
*H04L 25/02*   (2006.01)
*H04L 25/03*   (2006.01)
*H04L 5/00*   (2006.01)

(52) U.S. Cl.
CPC .......... *H04L 25/0204* (2013.01); *H04L 5/001* (2013.01); *H04L 5/0048* (2013.01); *H04L 25/0224* (2013.01); *H04L 25/03305* (2013.01)

(58) Field of Classification Search
CPC ..... H04L 25/00; H04L 25/02; H04L 25/0202; H04L 25/0204; H04L 25/0206; H04L 25/0208; H04L 25/0222; H04L 25/0224; H04L 25/0228; H04L 25/024; H04L 25/03292; H04L 25/03305; H04L 5/001; H04L 5/0048

See application file for complete search history.

(56) References Cited

U.S. PATENT DOCUMENTS

| | | | |
|---|---|---|---|
| 6,473,614 B1 * | 10/2002 | Quensel | H04W 36/30 455/422.1 |
| 9,124,464 B2 * | 9/2015 | Singh | H04L 27/265 |
| 9,219,575 B2 | 12/2015 | Hua et al. | |
| 9,596,014 B2 | 3/2017 | Yum et al. | |
| 9,680,577 B2 | 6/2017 | Kim et al. | |
| 9,923,649 B2 | 3/2018 | Gong et al. | |
| 2013/0237265 A1 * | 9/2013 | Khojastepour | H04B 7/024 455/509 |

(Continued)

*Primary Examiner* — Siu M Lee
(74) *Attorney, Agent, or Firm* — F. Chau & Associates, LLC

(57) ABSTRACT

A wireless communication device and a channel estimating method thereof are provided. A wireless communication device includes an interlayer interference detector configured to receive a reference signal including a plurality of layers transmitted through a plurality of ports respectively connected to a plurality of antennas and to determine whether interlayer interference occurs based on the reference signal; and a channel estimator configured to estimate a channel matrix by executing an algorithm that is based on whether the interlayer interference occurs. The wireless communication device may decode a receive signal based on the estimated channel matrix.

21 Claims, 10 Drawing Sheets

(56) References Cited

U.S. PATENT DOCUMENTS

| | | |
|---|---|---|
| 2016/0323756 A1* | 11/2016 | Shen .................... H04B 7/0617 |
| 2018/0145809 A1 | 5/2018 | Kwak et al. |
| 2018/0219642 A1 | 8/2018 | Fakoorian et al. |
| 2018/0227005 A1 | 8/2018 | Moher |
| 2018/0227069 A1 | 8/2018 | Lee et al. |
| 2018/0262244 A1* | 9/2018 | Noh ..................... H04L 5/0048 |
| 2018/0375690 A1* | 12/2018 | Kapetanovic ....... H04L 25/0224 |

* cited by examiner

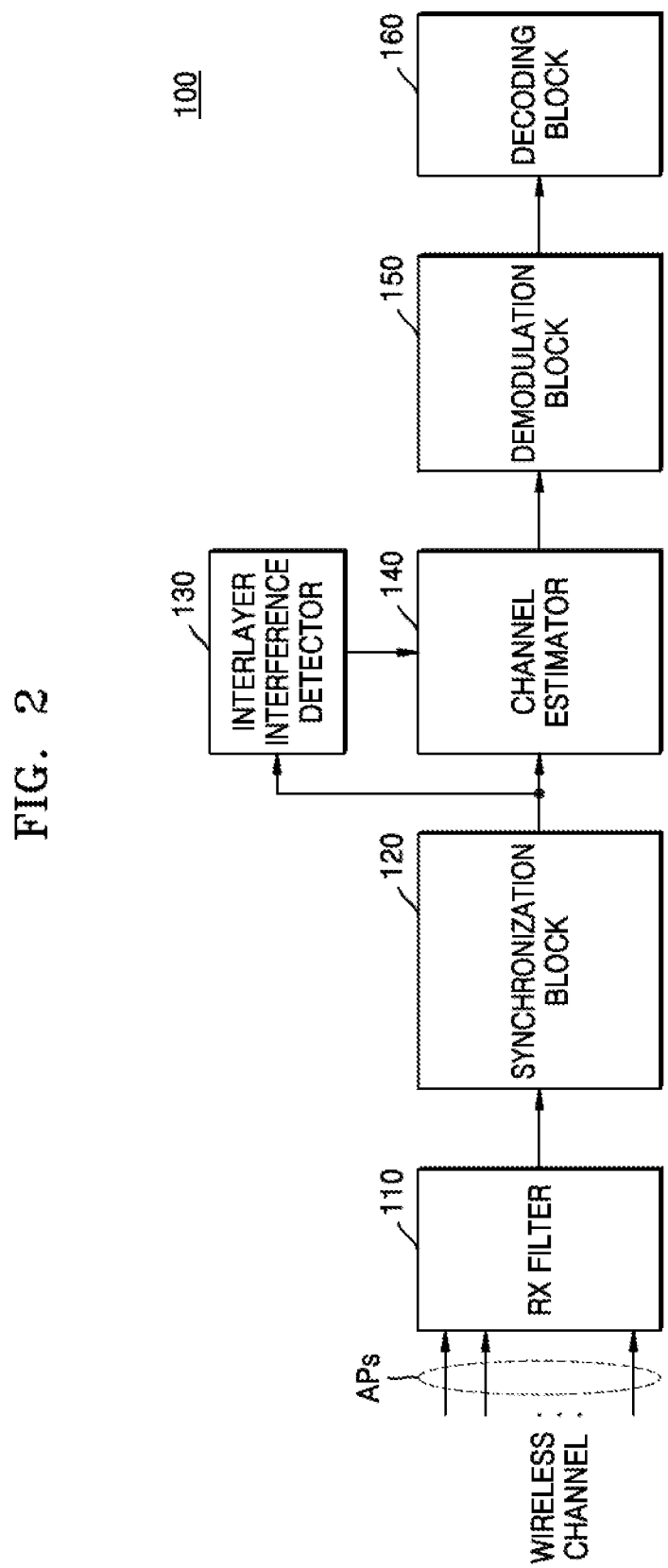

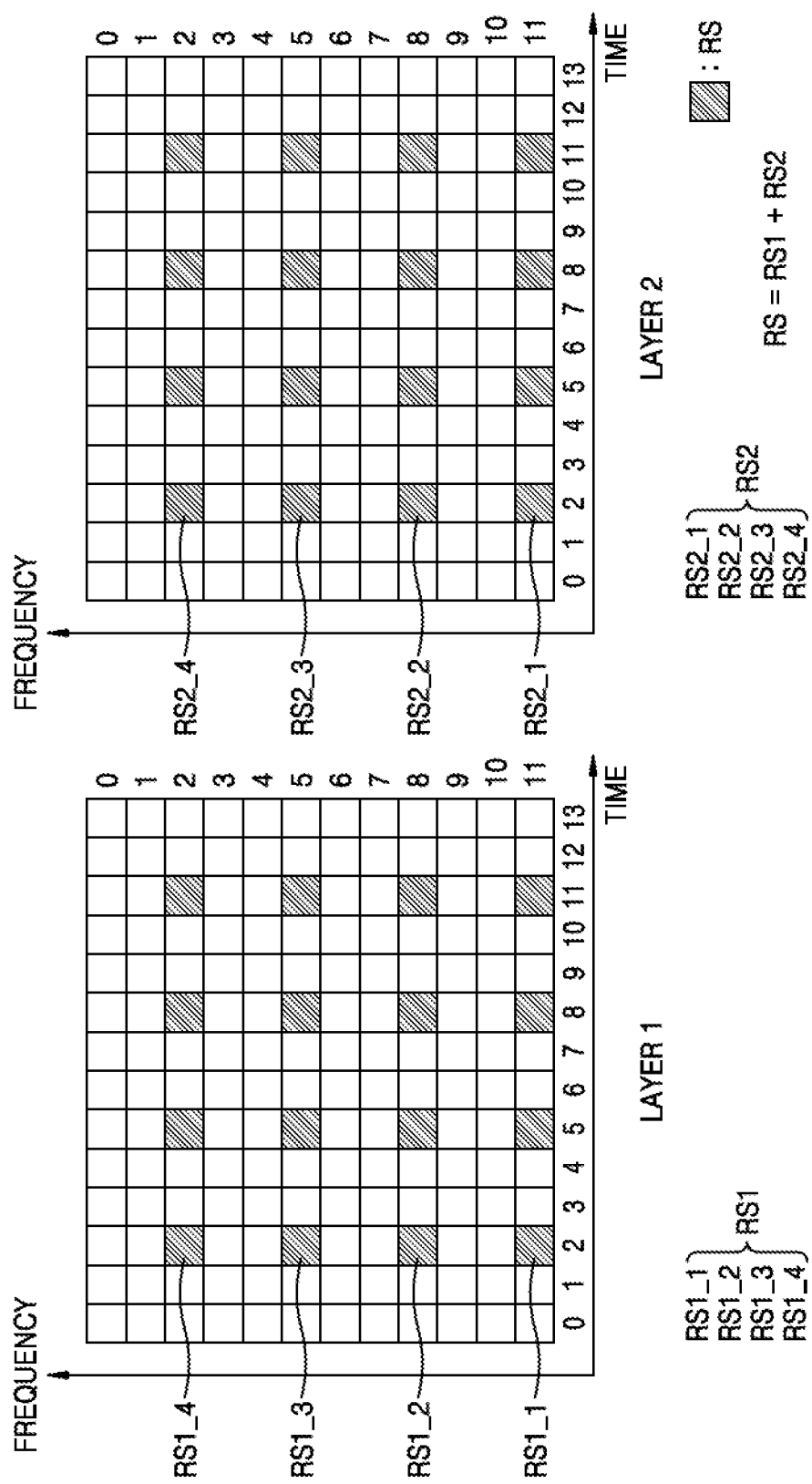

WIRELESS COMMUNICATION DEVICE AND CHANNEL ESTIMATING METHOD THEREOF

CROSS-REFERENCE TO RELATED APPLICATIONS

This application claims the benefit of Korean Patent Application Nos. 10-2019-0021950, filed on Feb. 25, 2019 and 10-2019-0063310, filed on May 29, 2019 in the Korean Intellectual Property Office, the disclosures of which are incorporated herein by reference in their entireties.

TECHNICAL FIELD

This disclosure relates generally to wireless communication devices, and more particularly, to wireless communication devices performing channel estimation, and channel estimating methods thereof.

DISCUSSION OF THE RELATED ART

In a wireless communication environment, the state of a wireless channel irregularly changes in time and frequency domains. Wireless communication devices may perform channel estimation to determine the amount of distortion of a receive signal received through a wireless channel and may decode the receive signal to recover transmit signal data based on an estimated channel value.

Meanwhile, in a transmit mode released in correspondence to the long term evolution (LTE) or 5th Generation (5G) protocols/proposals, wireless communication devices may perform channel estimation with respect to a target resource element based on reference signals. Such reference signals may be transmitted from a base station to wireless devices over pre-assigned sub-carriers and time slots. The wireless device may then measure amplitude and phase of a corresponding received signal at each of a plurality of antenna elements of the wireless device to arrive at a "channel estimate" of the wireless channel condition. The received signal at each antenna element may be a composite signal with signal energy components received from both a line of sight path and scattered paths. In a multi-input-multi-output (MIMO) system, for example, the channel estimate may be dynamically fed back to the base station, and the base station may implement a beamforming adjustment based on the channel estimate in an effort to improve or optimize the communication link.

SUMMARY

Embodiments of the inventive concept provide a wireless communication device for determining whether interlayer interference occurs in a plurality of channels and for estimating a channel using a different algorithm based on the occurrence or non-occurrence of the interlayer interference, and a channel estimating method of the wireless communication device.

Embodiments also provide a wireless communication system for allowing a terminal to output a setting change request to a base station based on channel setting information received from the base station.

According to an aspect of the inventive concept, there is provided a wireless communication device including an interlayer interference detector configured to receive a reference signal including a plurality of layers transmitted through a plurality of ports respectively connected to a plurality of antennas, and to determine whether interlayer interference occurs based on the reference signal. A channel estimator may estimate a channel matrix by executing an algorithm that is based on whether the interlayer interference occurs. The wireless communication device may decode a receive signal based on the estimated channel matrix.

According to another aspect of the inventive concept, there is provided a channel estimating method of a wireless communication device, which involves receiving a reference signal including a plurality of layers transmitted through a plurality of ports respectively connected to a plurality of antennas; determining whether interlayer interference occurs with respect to the reference signal; estimating a channel by executing a first algorithm when it is determined that the interlayer interference does not occur; and estimating the channel by executing a second algorithm different from the first algorithm when it is determined that the interlayer interference occurs.

According to a further aspect of the inventive concept, there is provided a wireless communication system including: a base station configured to output reference signal setting information; and a terminal configured to determine whether a current channel matrix is suitable for signal transmission and reception based on the reference signal setting information and to output a channel setting change request to the base station when the current channel matrix is unsuitable for the signal transmission and reception.

BRIEF DESCRIPTION OF THE DRAWINGS

Embodiments of the inventive concept will be more clearly understood from the following detailed description taken in conjunction with the accompanying drawings in which like reference characters indicate like elements or features, wherein:

FIG. 2 is a detailed block diagram of a wireless communication device according to an example embodiment;

FIGS. 3A and 3B are diagrams for explaining a channel estimating method according to an example embodiment;

DETAILED DESCRIPTION OF EMBODIMENTS

Hereinafter, embodiments will be described in detail with reference to the accompanying drawings.

Figure 1:
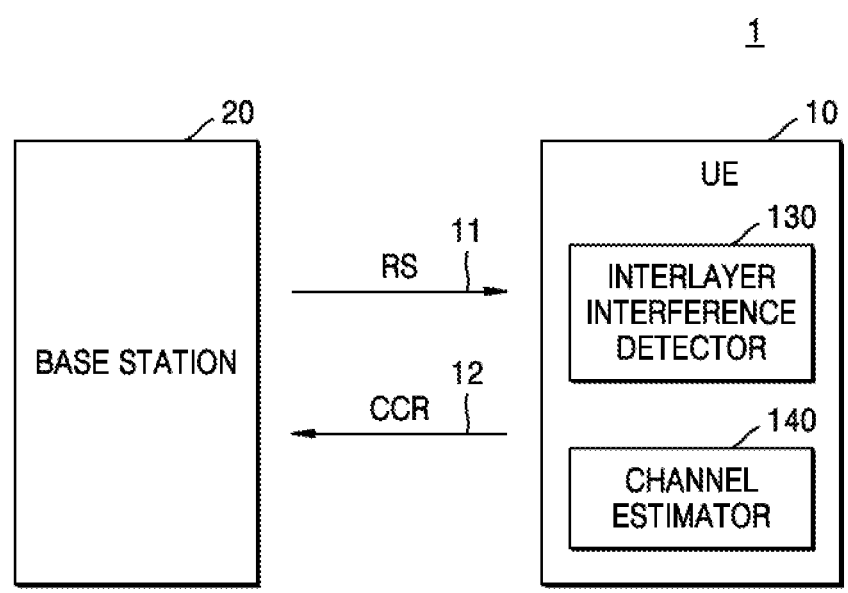
FIG. 1 is a block diagram of a wireless communication system according to an example embodiment.

FIG. 1 is a block diagram of a wireless communication system, 1, according to an example embodiment. The wireless communication system 1 may include a base station 20 and a terminal 10. The terminal 10 may be located within cell coverage of the base station 20. The base station 20 and the terminal 10 may communicate with each other through a downlink channel 11 and an uplink channel 12. During communication through the downlink channel 11, the base station 20 and the terminal 10 may respectively act as a wireless transmitter and a wireless receiver. During communication through the uplink channel 12, the base station 20 and the terminal 10 may respectively act as a wireless receiver and a wireless transmitter.

The base station 20 may be a fixed station that communicates with the terminal 10 and/or another base station and may transmit and receive data and/or control information to and from the terminal 10 and/or another base station. For example, the base station 20 may be referred to as a node B, an evolved-node B (eNB), a base transceiver system (BTS), or an access point (AP). The terminal 10 may be any of various wireless communication devices that may transmit and receive data and/or control information to and from the base station 20. For example, the terminal 10 may be referred to as user equipment (UE), mobile station (MS), a mobile terminal (MT), a user terminal (UT), a subscriber station (SS), a wireless device, or a portable device.

Wireless communication networks between the base station 20 and the terminal 10 may support communication among a plurality of users by sharing available network resources. For example, information may be transferred through wireless communication networks in various modes such as a code division multiple access (CDMA) mode, a frequency division multiple access (FDMA) mode, a time division multiple access (TDMA) mode, an orthogonal FDMA (OFDMA) mode, and a single carrier FDMA (SC-FDMA) mode.

As used herein, the term "layer" refers to signals of an independent data stream transmitted to a receiving device using a respective set of antenna resources, as in a MIMO system. For instance, in a polarization diversity scheme, a first antenna element or elements may transmit a first data stream of a first layer with a first polarization, and a second antenna element or elements may transmit signals of a second data stream of a second layer with a second, orthogonal polarization. The receiving device may receive the first and second data streams using different antennas configured to receive signals arriving with different respective polarizations. The first and second data streams may be component data streams of a common communication session, whereby data throughput for that communication session is increased. In another example, a first antenna element may form a beam pointing in a first direction to transmit a first layer and a second antenna element may form a beam pointing in a second direction to transmit a second layer. In yet another example, the same set of antenna elements may be used to transmit different layers through the use of different analog beamforming networks, each coupled to the set of antenna elements but generating a different phase relationship between the antenna elements to form beams pointing in different directions. In this case, a first beamforming network may be used to transmit a first data stream through the antenna elements with a first beam pointing in a first direction, and a second beamforming network may be used to concurrently transmit a second data stream through the same antenna elements with a second beam pointing in a second direction. Such beamforming to communicate data streams using different layers may occur on the receive side as well as on the transmit side.

As used herein, the term "antenna port" (interchangeably, "port" for brevity) refers to an antenna element.

The base station 20 may transmit a downlink signal including data to the terminal 10 through at least one antenna port. The base station 20 may perform multi-layer transmission through a plurality of antenna ports at the base station 20 and a plurality of antenna ports at the terminal 10. The base station 20 may transmit a reference signal RS (which may comprise a plurality of symbols), to the terminal 10 through the downlink channel 11. The reference signal RS, which may be transmitted within an allocated time slot, may comprise a plurality of symbols transmitted through different sub-carriers simultaneously or sequentially in an OFDM scheme. Each sub-carrier may carry one symbol or a sequence of symbols within the allocated time slot. According to an embodiment, the base station 20 may transmit the reference signal RS using multi-input multi-output (MIMO) communication. As understood from the discussion of "layers" above, MIMO communication may refer to communication through multiple layers using a plurality of antennas.

Now, the reference signal RS is a signal used to estimate a channel for a data signal and may be referred to as a pilot. In the uplink direction, the reference signal RS may be a demodulation reference signal (DM-RS) (as designated in LTE/5G protocols/proposals) which is used for channel estimation in a certain terminal. In the downlink direction, the reference signal RS may include a common reference signal (CRS) and/or a channel state information reference signal (CSI-RS) (both of which are designated in LTE/5G protocols/proposals.) Other types of signals may be alternatively used for the reference signal RS. Hereinafter, it is assumed that the reference signal RS is a downlink reference signal.

The terminal 10 may include an interlayer interference detector 130 and a channel estimator 140. Each of the elements included in the terminal 10 may be implemented as a hardware block including an analog circuit and/or a digital circuit or processing circuitry executing a software block including a plurality of instructions.

The interlayer interference detector 130 may determine whether interlayer interference occurs with respect to the reference signal RS transmitted through multiple layers. Herein, a "determination of whether interlayer interference occurs" or like phrase is a determination as to whether interlayer interference is above a threshold or exhibits certain characteristics according to predefined criteria, examples of which are discussed below. A method, performed by the interlayer interference detector 130, of determining whether interlayer interference occurs will be described in detail with reference to FIGS. 6 through 8.

The interlayer interference detector 130 may output information indicative of whether interlayer interference occurs with respect to the reference signal RS to the channel estimator 140, and the channel estimator 140 may estimate a receive channel based on whether interlayer interference occurs.

According to embodiments, since the terminal 10 determines whether interlayer interference occurs with respect to the reference signal RS and estimates a receive channel in a manner that is based on whether interlayer interference occurs, a channel suitable for signal transmission and reception may be efficiently estimated despite the interlayer interference, and data transmission and reception may be smoothly performed afterward. For example, the terminal 10 may decode a receive signal based on the estimated channel matrix. For example, beamforming performed by the base station 20 and/or the terminal 10 may be adjusted based on the estimated channel matrix. Alternatively or additionally, the results of the estimated channel matrix may be used to determine whether or not to maintain a current number of layers being used to exchange data between the base station 20 and the terminal 10.

The terminal 10 may determine whether a current channel setting is appropriate based on the reference signal RS and may provide a channel setting change request CCR to the base station 20 through the uplink channel 12. The base station 20 may output the reference signal RS based on a changed setting to the terminal 10 in response to the channel setting change request CCR. For example, the base station 20 may change allocated sub-carriers and/or time slots of the reference signal RS based on the channel setting change request CCR.

According to an embodiment, the terminal 10 may determine whether a current channel setting is appropriate and may provide the channel setting change request CCR to the base station 20 based on a determination result, and accordingly, a channel setting appropriate for smooth data transmission and reception between the base station 20 and the terminal 10 may be achieved.

FIG. 2 is a block diagram of a wireless communication device ("wireless device" or just "device" for brevity) 100, according to an example embodiment. The wireless device 100 may be any type of device that receives a signal through a wireless network, and is an example of the terminal 10 in FIG. 1.

As shown in FIG. 2, the wireless device 100 may include a receive (RX) filter 110, a synchronization block 120, the interlayer interference detector 130, the channel estimator 140, a demodulation block 150, and a decoding block 160.

The RX filter 110 may filter downlink signals received from antenna ports APs of a base station so as to pass only signals at desired frequencies. The RX filter 110 may also convert received signals into digital signals.

In the case of initial access to a cell, when the terminal performs handover from a current cell to another cell or cell reselection, the synchronization block 120 may perform a cell search using synchronous signals (e.g., a primary synchronous signal (PSS) and a secondary synchronous signal (SSS)) included in the filtered downlink signal and may obtain frequency and symbol synchronization with respect to the cell through the cell search using the synchronous signals. The synchronization block 120 may also obtain downlink frame synchronization for the cell and determine a cell identifier (ID).

The interlayer interference detector 130 may measure interlayer interference with respect to a reference signal transmitted from the antenna ports APs of the base station 20 and may output a signal indicative of whether the interlayer interference occurs to the channel estimator 140 based on a measurement result.

The channel estimator 140 may select an algorithm for estimating a receive channel for the reference signal based on whether the interlayer interference occurs. In an embodiment, when interlayer interference does not occur, the channel estimator 140 may not separate results for frequency channels of a layer (e.g., an averaging of results for different subcarriers may be performed instead, and the averaging result is used) and may estimate the receive channel using a first algorithm, which estimates the receive channel based on the variance of noise in the reference signal. In an embodiment, the first algorithm may include equations (1) and (2) as follows, where eqn. (1) may include a signal filter parameter in accordance with the first algorithm:

$$F_{1i} = R_{HH_i^P} W_i^H (W_i R_{H_i^P H_i^P} W_i^H + \sigma_n^2 I)^{-1}. \quad \text{eqn. (1)}$$

Here, $F_{1i}$ is the signal filter in accordance with the first algorithm, and $H_i^P = [H_i^P(0), \ldots H_i^P(L-1)]^T$ is a channel vector corresponding to an i-th port for the received reference signal. In addition, H is an estimation target channel, $R_{HH_i^P} R_{H_i^P H_i^P}$ are respectively a cross-correlation of H and $H_i^P$, and, and auto-correlation of $H_i^P$, and $\sigma_n^2$ is the variation of noise. $W_i^H$ is an orthogonal cover code matrix corresponding to the estimation target channel, I is a unit matrix, and ( )^-1 is an inverse function.

$$\hat{H}_i = \tilde{Y} F_{1i}. \quad \text{(eqn. (2))}$$

where $\tilde{Y} = [\tilde{Y}(0), \ldots \tilde{Y}(N-1)]^T$ is a receive signal, and $\hat{H}_i$ is an estimated receive channel. The receive signal Y may include a term associated with a plurality of layers and a noise term.

In an embodiment, when interlayer interference occurs, the channel estimator 140 may estimate a receive channel using a second algorithm considering the interlayer interference, where the second algorithm may separate measurement results of the frequency channels of two layers from each other to estimate the receive channel.

In an embodiment, the second algorithm may include the following eqns. (3) and (4), where eqn. (3) may define a signal filter considering interlayer interference:

$$F_{2i} = R_{HH_i^P} W_i^H \left( \sum_{k=n}^{n+1} W_k R_{H_k^P H_k^P} W_k^H + \sigma_n^2 I \right)^{-1} \quad \text{eqn. (3)}$$

Here, $F_{2i}$ is the signal filter in accordance with the second algorithm, $H_i^P = [H_i^P(0), \ldots H_i^P(L-1)]^T$ is a channel vector corresponding to the i-th port for the received reference signal, and $W_n = \text{diag}[1,1,\ldots,1,1]$, $W_{n+1} = \text{diag}[1,-1,\ldots,1,-1]$ is an orthogonal cover code matrix for two ports receiving the reference signal. In addition, H is an estimation target channel, $R_{HH_k^P} R_{H_k^P H_k^P}$ are respectively a cross-correlation of H and $H_k^P$, and, an auto-correlation of $H_k^P$, and $\sigma_n^2$ is the variation of noise, where "n" is a channel number of the estimated target channel. When an interlayer interference filter is determined using eqn. (3), the receive channel may be estimated using eqn. (4):

$$\hat{H}_i = \tilde{Y} F_{2i}. \quad \text{eqn. (4)}$$

Here, $\tilde{Y} = [\tilde{Y}(0), \ldots \tilde{Y}(N-1)]^T$ is a receive signal, and $\hat{H}_i$ is an estimated receive channel.

The demodulation block 150 may detect a data signal using downlink channel estimation and modulate a detected value. An operation of detecting a data signal may include obtaining an estimated data signal using an estimated channel value corresponding to a resource element, to which the data signal is mapped. The decoding block 160 may obtain a data signal, which is transmitted from a base station to a terminal, by descrambling and decoding a modulated data signal.

In an embodiment, the wireless communication device 100 may further include a terminal state information generator. The terminal state information generator may generate channel state information, which may be calculated based on moving speed information of a terminal and/or multi-path channel delay information of the terminal. The terminal state information generator may measure a speed at which a current terminal moves in the cell range of the base station 20 in FIG. 1 and may thereby generate moving speed information. Additionally or alternatively, the terminal state information generator generates multi-path channel delay information with respect to a downlink signal, which is received by the current terminal through other base stations or repeaters or after being reflected from an object such as a building. The terminal state information generator may periodically or non-periodically generate and provide channel state information to the base station 20 in FIG. 1.

The wireless communication device 100 described with reference to FIG. 2, but other configurations may be substituted in alternative embodiments. The wireless communication device 100 may have various configurations according to various communication protocols.

Figure 3B:
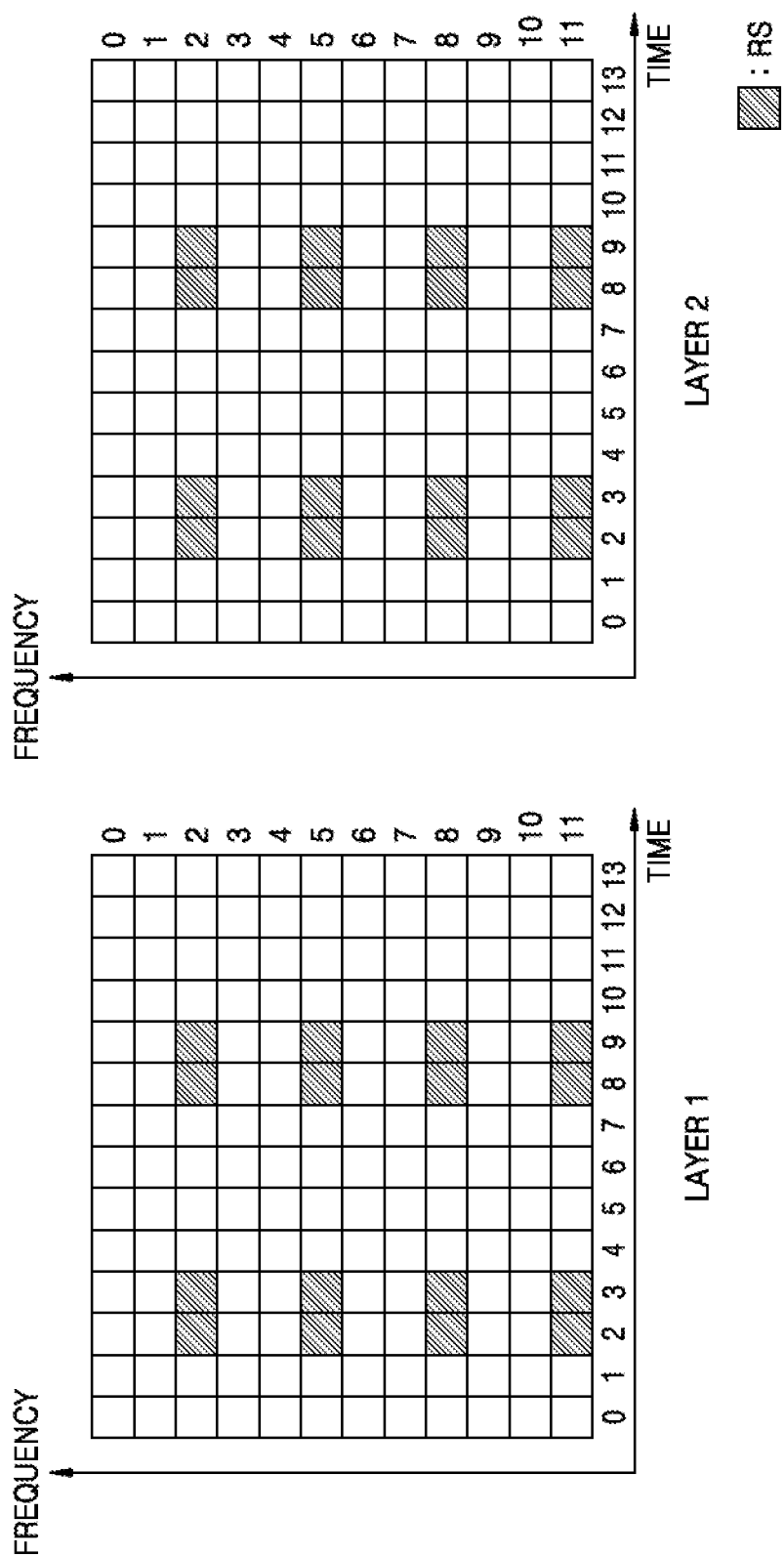

FIGS. 3A and 3B are diagrams for explaining a channel estimating method according to an example embodiment. The channel estimating method of FIGS. 3A and 3B may be performed by the wireless communication device 100 of FIG. 2.

Referring to FIGS. 2 and 3A, the horizontal axis is time and the vertical axis is frequency. Numerals on the horizontal axis may represent symbol time slots, and numerals on the vertical axis may represent subcarrier indices. A first layer Layer1 may correspond to signals transmitted using a first set of antenna resources at the base station (first antenna element(s) and/or a first beamforming network) and a second Layer2 may correspond to signals received through a second set of antenna resources at the base station. A subframe corresponding to a single layer may include fourteen symbols in a time domain and twelve subcarriers in a frequency domain.

For channel estimation, the base station 20 in FIG. 1 may transmit reference signals RS at predetermined time-frequency positions ("resource elements") in each downlink subframe through a plurality of layers, and data signals may be transmitted through other time-frequency positions. Some of the data signals may be signals corresponding to various types of physical channels.

Referring to FIG. 3A, the reference signals RS may be assigned (or "mapped") to resource elements that correspond to subcarrier indices 2, 5, 8, and 11 and symbol time slots 2, 5, 8, and 11. In an embodiment, a reference signal RS is composed of a first layer reference signal RS1 and a second layer reference signal RS2, where signals RS1 and RS2 may be transmitted simultaneously in one embodiment, or sequentially in an alternative embodiment. The first layer reference signal RS1 is composed of four reference signals of different respective subcarriers: a first reference signal RS1_1, a second reference signal RS1_2, a reference signal RS1_3 and a reference signal RS1_4. The second layer reference signal RS2 may be also be composed of four reference signals of different respective subcarriers: a third reference signal RS2_1, a fourth reference signal RS2_2, a reference signal RS2_3 and a reference signal RS2_4. All the subcarriers of the first layer reference signal RS1 may be transmitted from a first antenna port of the base station, whereas all the subcarriers of the second layer reference signal RS2 may be transmitted from a second antenna port of the base station. The first reference signal RS_1 may be mapped to a resource element that corresponds to subcarrier index 11 and symbol time slot 2, and the second reference signal RS_2 may be mapped to a resource element that corresponds to subcarrier index 8 and symbol time slot 2. The third reference signal RS2_1 may be mapped to the same resource element as the first reference signal RS_1 but transmitted from the second antenna port, and the fourth reference signal RS2_2 may be mapped to the same resource element as the second reference signal RS_2 but transmitted from the second antenna port.

Since the first reference signal RS1_1 and the third reference signal RS2_1 or the second reference signal RS1_2 and the fourth reference signal RS2_2 are transmitted from different antenna ports but use the same resource element, interlayer interference may occur between signals of different layers.

According to an embodiment, a wireless communication device may determine whether interference between a plurality of layers occurs and may remove the interlayer interference by separating the results for frequency channels of two layers from each other, thereby increasing the accuracy of estimation of a receive channel (where each frequency channel corresponds to a respective subcarrier).

Referring to FIG. 3B, the reference signals RS may be alternatively assigned to resource elements that correspond to subcarrier indices 2, 5, 8, and 11 and symbol indices 2, 3, 8, and 9. Although an element pattern for arrangement of the reference signals RS in FIG. 3B is different from that in FIG. 3A, interlayer interference may still occur and embodiments may be applied to the case of FIG. 3B.

In this description, a standard by which reference signals are arranged as shown in FIG. 3A or 3B may be referred to as a channel pattern. In other words, the standard shown in FIG. 3A may be referred to as a first channel pattern, and the standard shown in FIG. 3B may be referred to as a second channel pattern.

FIGS. 3A and 3B show just examples of the arrangement of reference signals, and the number and the arrangement pattern of reference signals in a single subframe may vary with an antenna port or ports through which the subframe is transmitted, a transmit mode, or the like.

Figure 4:
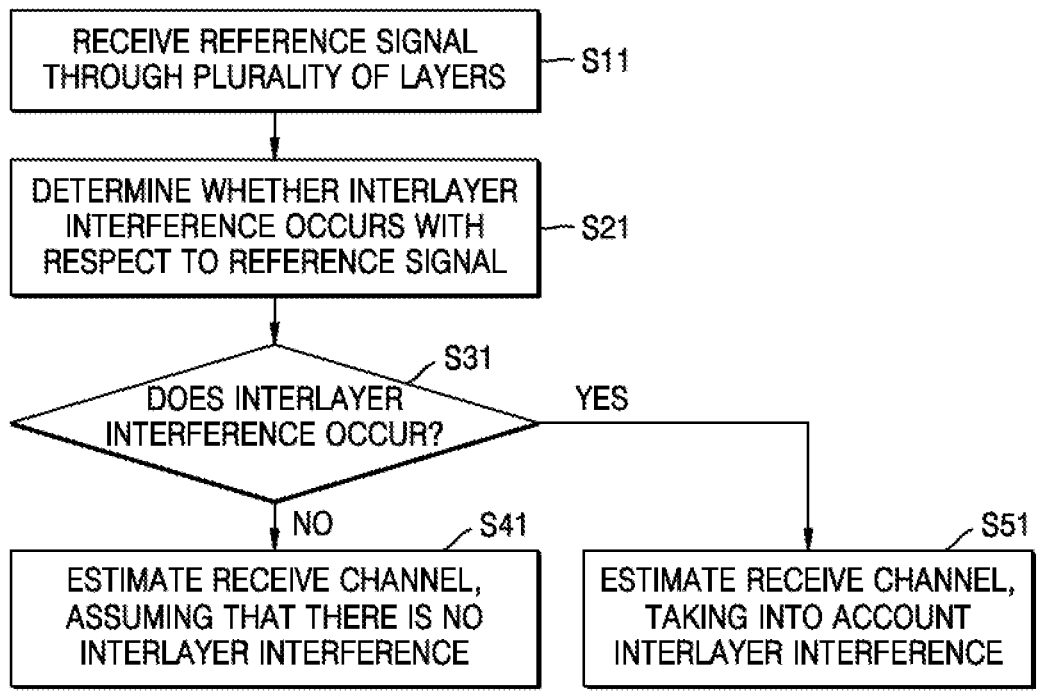
FIG. 4 is a flowchart of a channel estimating method according to an example embodiment.

FIG. 4 is a flowchart of a channel estimating method according to an example embodiment.

Referring to FIGS. 2 and 4, the wireless communication device 100 may receive a reference signal through a plurality of layers in operation S11. The wireless communication device 100 may determine whether interlayer interference occurs with respect to the reference signal in operation S21.

When the interlayer interference does not occur in operation S31, the wireless communication device 100 may not separate the results for the frequency channels of two layers from each other and may estimate a receive channel in operation S41. In an embodiment, the wireless communication device 100 may estimate the receive channel using the first algorithm including eqns. (1) and (2) described above with reference to FIG. 2.

Otherwise, when the interlayer interference occurs in operation S31, the wireless communication device 100 may estimate a receive channel, taking into account the interlayer interference, by separating the results for the frequency channels of two layers from each other in operation S51. In an embodiment, the wireless communication device 100 may estimate the receive channel using the second algorithm including eqns. (3) and (4) described above with reference to FIG. 2.

Figure 5:
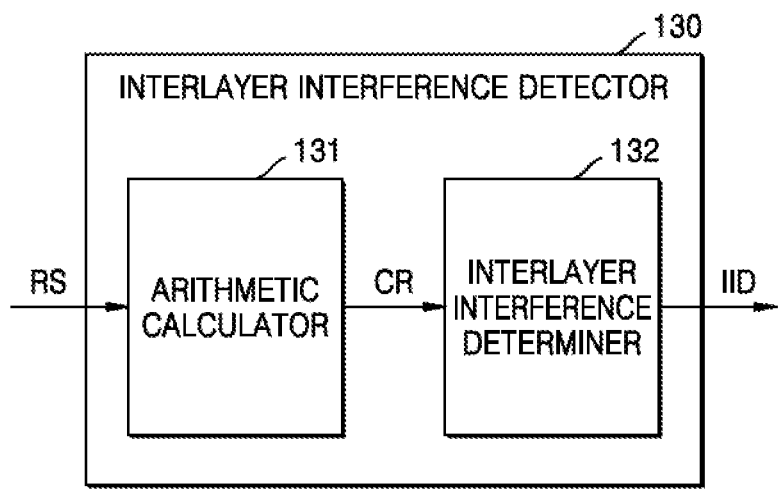
FIG. 5 is a block diagram of an interlayer interference detector according to an example embodiment.

FIG. 5 is a block diagram of an interlayer interference detector 130 according to an example embodiment. The interlayer interference detector 130 may include an arithmetic calculator 131 and an interlayer interference determiner 132. The arithmetic calculator 131 may receive a reference signal RS, generate a calculation result CR by applying the reference signal RS to a predetermined formula, and output the calculation result CR to the interlayer interference determiner 132. The interlayer interference determiner 132 may compare the calculation result CR with a predetermined reference value, determine whether interlayer interference occurs, and output an interlayer interference measurement signal IID to the channel estimator 140 in FIG. 2. In an embodiment, the interlayer interference measurement signal IID may include information indicating a selected algorithm (e.g., the first algorithm or the second algorithm described with reference to FIG. 2) for estimating a channel.

In an embodiment, the reference signal RS may include a first frequency channel receive signal (e.g., the first reference signal RS1_1 in FIG. 3A) received through a first frequency channel (e.g., subcarrier index 11 in FIG. 3A) and a second frequency channel receive signal (e.g., the second reference signal RS1_2 in FIG. 3A) received through a second frequency channel (e.g., subcarrier index 8 in FIG. 3A), and the arithmetic calculator 131 may perform a correlation on a first channel vector corresponding to the first frequency channel and a second channel vector corresponding to the second frequency channel and generate a correlation value as a calculation result. The interlayer interference determiner 132 may compare the correlation value with a first reference value and determine that interlayer interference occurs when the correlation value is less than the first reference value. In an embodiment, the interlayer interference detector 130 may determine whether interlayer interference occurs using equation (5):

$$|Cor(H_i^p(0), H_i^p(1))| \gamma_1 \qquad \text{eqn. (5)}$$

where $H_i^p(0)$ is the first channel vector, $H_i^p(1)$ is the second channel vector, and $\gamma_i$ is the first reference value. Cor( ) represents a correlation on two functions.

In an embodiment, the arithmetic calculator 131 may obtain, as a calculation result, a maximum delay spread for the reference signal RS, and the interlayer interference determiner 132 may compare the maximum delay spread with a second reference value and determine that interlayer interference occurs when the maximum delay spread is greater than the second reference value. In an embodiment, the interlayer interference detector 130 may determine whether interlayer interference occurs using eqn. (6):

$$D > \gamma_2 \qquad \text{eqn. (6)}$$

where D is the maximum delay spread for the reference signal RS and $\gamma_2$ is the second reference value.

In an embodiment, the reference signal RS may include a first frequency channel receive signal (e.g., the first reference signal RS1_1 in FIG. 3A) received through a first frequency channel (e.g., subcarrier index 11 in FIG. 3A) and a second frequency channel receive signal (e.g., the second reference signal RS1_2 in FIG. 3A) received through a second frequency channel (e.g., subcarrier index 8 in FIG. 3A), and the arithmetic calculator 131 may generate an interference metric based on a difference between the first frequency channel receive signal and the second frequency channel receive signal, perform normalization on the interference metric, and generate a normalized value as a calculation result. The interlayer interference determiner 132 may compare the normalized value with a third reference value and determine that interlayer interference occurs when the normalized value is greater than the third reference value. In an embodiment, the third reference value may be generated based on the variance of noise, which occurs when the reference signal RS is received.

In an embodiment, an interference metric Z may be defined according to eqn. (7):

$$Z = \frac{(\tilde{Y}(0) - \tilde{Y}(1))}{2} \qquad \text{eqn. (7)}$$

where $\tilde{Y}(0)$ is the first channel receive signal and $\tilde{Y}(1)$ is the second channel receive signal. With this result, the interlayer interference detector 130 may determine whether interlayer interference occurs using eqn. (8):

$$E(\|Z\|^2) > \gamma_3 \qquad \text{eqn. (8)}$$

where $\gamma_3$ is the third reference value. E( ) is represents a normalized mean function of Z.

Figure 6:
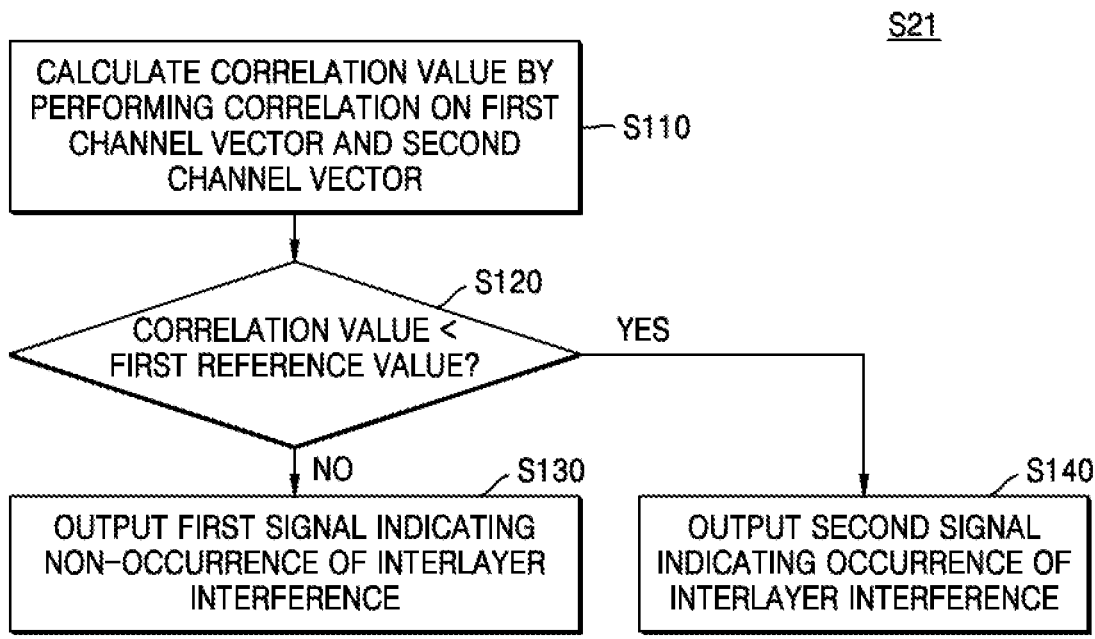
FIG. 6 is a flowchart of a method of determining occurrence or non-occurrence of interlayer interference, according to an example embodiment.

FIG. 6 is a flowchart of a method of determining occurrence or non-occurrence of interlayer interference, according to an example embodiment. In detail, FIG. 6 may illustrate an example of operation S21 in FIG. 4. Redundant descriptions already given with reference to FIG. 5 will be omitted.

Referring to FIGS. 5 and 6, the interlayer interference detector 130 may calculate a correlation value by performing a correlation on a first channel vector and a second channel vector in operation S110. In an embodiment, the first channel vector and the second channel vector may be empirically obtained with respect to corresponding frequency channels. The interlayer interference detector 130 may compare the correlation value with a first reference value, which is predetermined, in operation S120.

When the correlation value is not less than the first reference value, the interlayer interference detector 130 may output a first signal (e.g., IID=0), which indicates non-occurrence of interlayer interference, to the channel estimator 140 in FIG. 2 in operation S130. When the correlation value is less than the first reference value, the interlayer interference detector 130 may output a second signal (e.g., IID=1), which indicates occurrence of interlayer interference, to the channel estimator 140 in FIG. 2 in operation S140.

Figure 7:
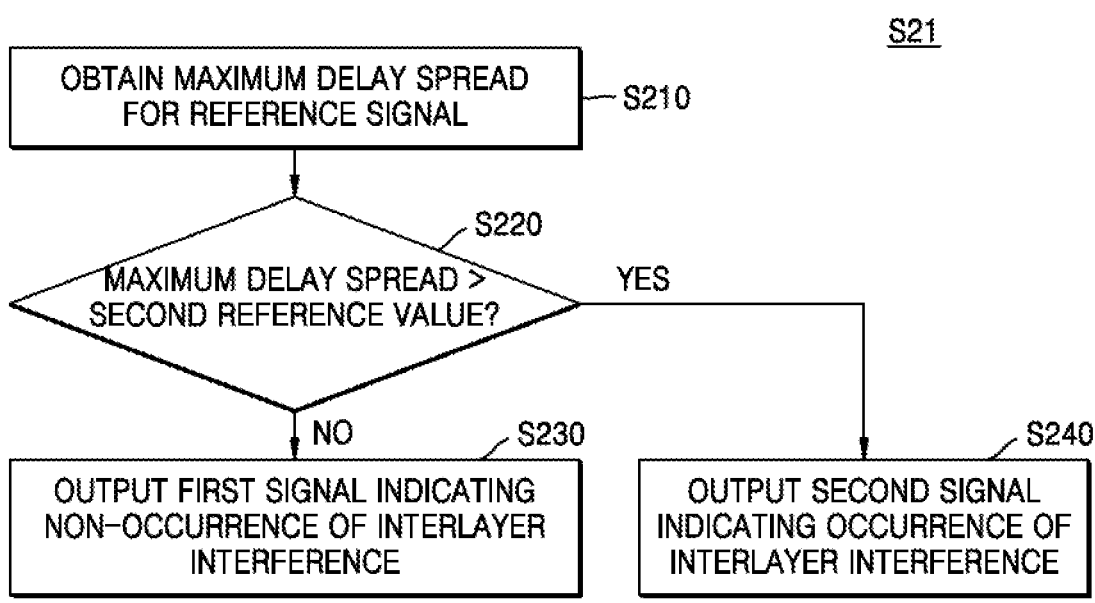
FIG. 7 is a flowchart of a method of determining occurrence or non-occurrence of interlayer interference, according to an example embodiment.

FIG. 7 is a flowchart of a method of determining occurrence or non-occurrence of interlayer interference, according to an example embodiment. In detail, FIG. 7 may illustrate another example of operation S21 in FIG. 4. Redundant descriptions already given with reference to FIG. 5 will be omitted.

Referring to FIGS. 5 and 7, the interlayer interference detector 130 may obtain a maximum delay spread for the reference signal RS in operation S210. In an embodiment, the reference signal RS may include information about the maximum delay spread, and the interlayer interference detector 130 may obtain the maximum delay spread using the information. Alternatively, the interlayer interference detector 130 may obtain the maximum delay spread by applying the reference signal RS to a predetermined algorithm. The interlayer interference detector 130 may compare the maximum delay spread with a second reference value, which is predetermined, in operation S220.

When the maximum delay spread is not greater than the second reference value, the interlayer interference detector 130 may output a first signal (e.g., IID=0), which indicates non-occurrence of interlayer interference, to the channel estimator 140 in FIG. 2 in operation S230. When the maximum delay spread is greater than the second reference value, the interlayer interference detector 130 may output a second signal (e.g., IID=1), which indicates occurrence of interlayer interference, to the channel estimator 140 in FIG. 2 in operation S240.

Figure 8:
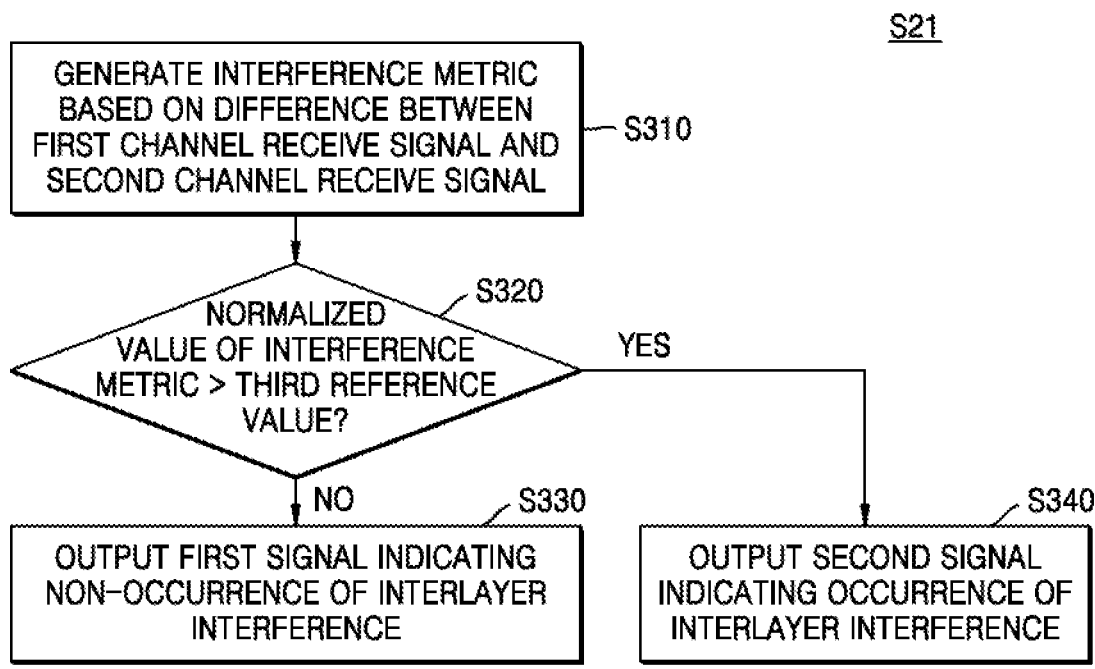
FIG. 8 is a flowchart of a method of determining occurrence or non-occurrence of interlayer interference, according to an example embodiment.

FIG. 8 is a flowchart of a method of determining occurrence or non-occurrence of interlayer interference, according to an example embodiment. In detail, FIG. 8 may illustrate another example of operation S21 in FIG. 4. Redundant descriptions already given with reference to FIG. 5 will be omitted.

Referring to FIGS. 5 and 8, the interlayer interference detector 130 may generate an interference metric based on a difference between a first frequency channel receive signal and a second frequency channel receive signal in operation S310. The interlayer interference detector 130 may compare a normalized value of the interference metric with a third reference value in operation S320.

When the normalized value is not greater than the third reference value, the interlayer interference detector 130 may output a first signal (e.g., IID=0), which indicates non-occurrence of interlayer interference, to the channel estimator 140 in FIG. 2 in operation S330. When the normalized value is greater than the third reference value, the interlayer interference detector 130 may output a second signal (e.g., IID=1), which indicates occurrence of interlayer interference, to the channel estimator 140 in FIG. 2 in operation S340.

Figure 9:
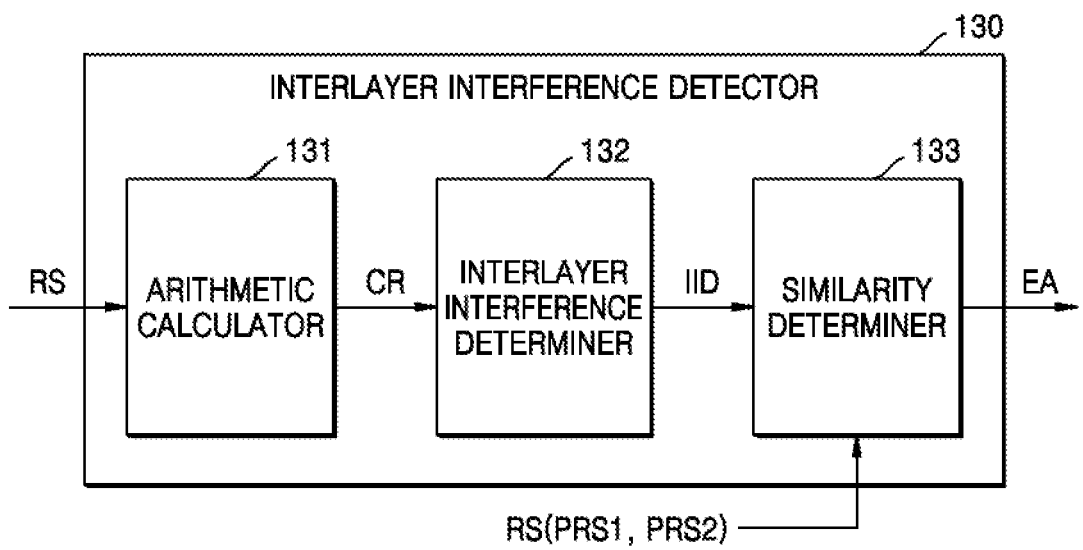
FIG. 9 is a block diagram of an interlayer interference detector according to an example embodiment.

FIG. 9 is a block diagram of an interlayer interference detector according to an example embodiment.

Referring to FIG. 9, the interlayer interference detector 130 may include the arithmetic calculator 131, the interlayer interference determiner 132, and a similarity determiner 133. The arithmetic calculator 131 and the interlayer interference determiner 132 have been described above with reference to FIG. 5, and thus, descriptions thereof will be omitted.

The similarity determiner 133 may receive the reference signal RS including a first port receive signal PRS1 and a second port receive signal PRS2 and may determine similarity between a sequence of the first port receive signal PRS1 and a sequence of the second port receive signal PRS2 based on the interlayer interference measurement signal IID. In an embodiment, the sequence may refer to a data sequence of each of the first port receive signal PRS1 and the second port receive signal PRS2.

In an embodiment, the similarity determiner 133 may determine the similarity based on an interference metric. An interference metric $Z(n)$ may be defined according to eqn. (9):

$$Z(n) = \frac{(\tilde{Y}(n) - \tilde{Y}(n+1))}{2} \qquad \text{eqn. (9)}$$

When an interference correlation value $R_Z(1)$ and a fourth reference value $\gamma_4$ satisfy the following eqn. (10), the similarity determiner 133 may determine that the first port receive signal PRS1 is similar to the second port receive signal PRS2:

$$R_Z(1) > \gamma_4, \qquad \text{eqn. (10)}$$

The interference correlation value $R_Z(1)$ may be defined according to eqn. (11):

$$R_Z(1) = E[Z(n)Z^*(n+1)] \qquad \text{eqn. (11)}$$

where E( ) represents a mean function.

When the first port receive signal PRS1 is similar to the second port receive signal PRS2, the similarity determiner 133 may output a determination signal EA to the channel estimator 140 in FIG. 2, and the channel estimator 140 may estimate a receive channel using a different algorithm based on the determination signal EA. This will be described in detail with reference to FIG. 10 below.

Figure 10:
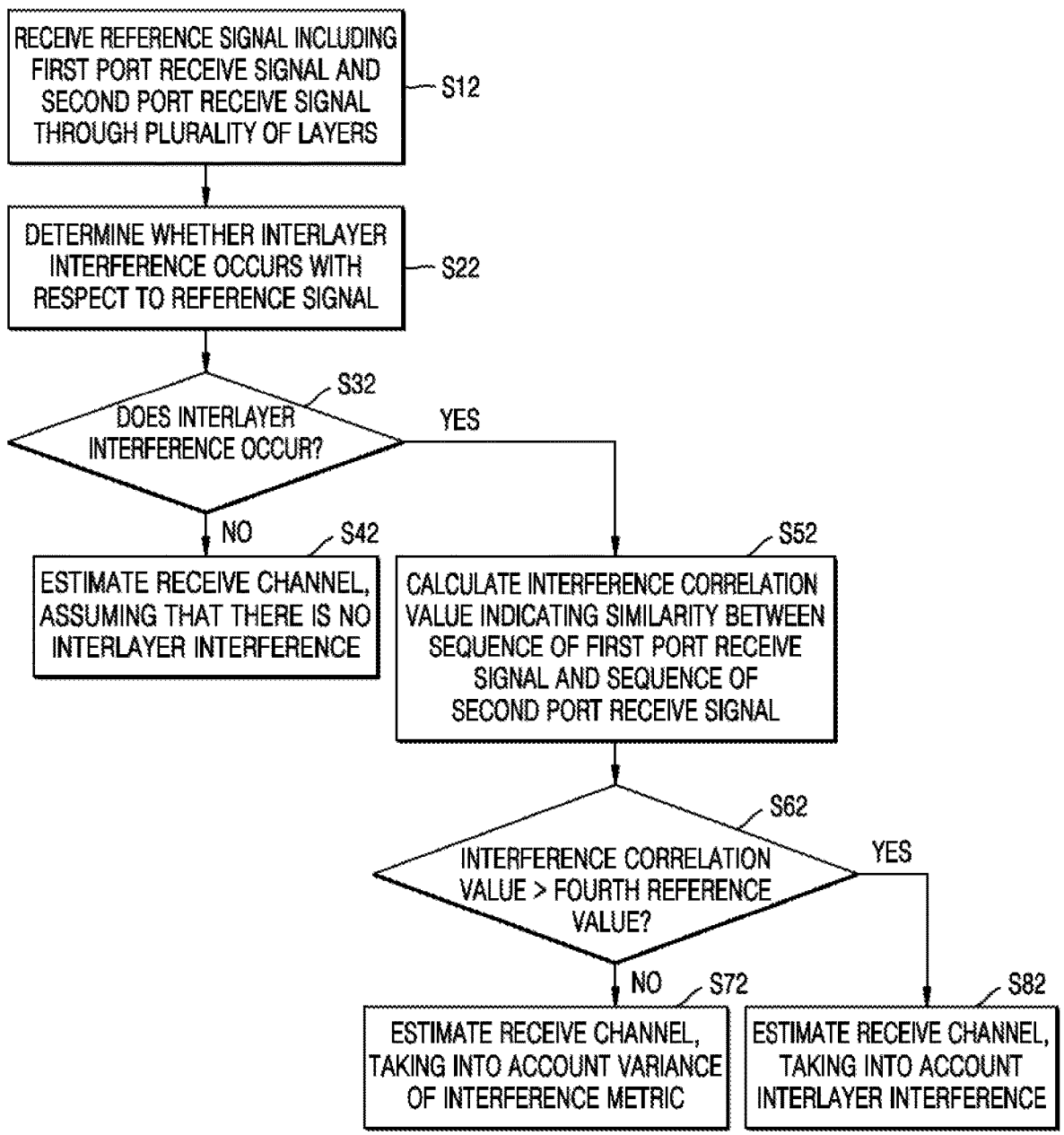
FIG. 10 is a flowchart of a channel estimating method according to an example embodiment.

FIG. 10 is a flowchart of a channel estimating method according to an example embodiment. Redundant descriptions already given with reference to FIG. 4 will be omitted.

Referring to FIGS. 2, 4, and 10, the wireless communication device 100 may receive a reference signal, which includes a first port receive signal and a second port receive signal, through a plurality of layers in operation S12. The wireless communication device 100 may determine whether interlayer interference occurs with respect to the reference signal in operation S22. Operation S22, in which whether interlayer interference occurs is determined, may be the same as or similar to operation S21 in FIG. 4, and thus, descriptions thereof will be omitted.

When interlayer interference does not occur in operation S32, the wireless communication device 100 may estimate a receive channel, without separating the results for frequency channels of two layers from each other, in operation S42. Operation S42, in which the receive channel is estimated without separating the results for frequency channels of two layers, may be the same as or similar to the first algorithm described in operation S41 in FIG. 4, and thus, descriptions thereof will be omitted.

When interlayer interference occurs in operation S32, the wireless communication device 100 may calculate an interference correlation value, which indicates a similarity between the sequence of the first port receive signal PRS1 and the sequence of the second port receive signal PRS2, in operation S52. A method of calculating the interference correlation value is the same as that described with reference to FIG. 9 above.

When the interference correlation value is greater than a fourth reference value, which is predetermined, the wireless communication device 100 may separate the frequency channels of two layers from each other and estimate a receive channel in operation S82. Operation S82, in which the frequency channels of two layers are separated from each other and the receive channel is estimated, may be the same as or similar to the second algorithm described in operation S51 in FIG. 4, and thus, descriptions thereof will be omitted.

When the interference correlation value is not greater than the fourth reference value, the wireless communication device 100 may estimate a receive channel, taking into account the variance of an interference metric, in operation S72. In an embodiment, the wireless communication device 100 may estimate the receive channel using a third algorithm considering the variance of the interference metric. The third algorithm may include eqns. (12) and (13) below. In particular, eqn. (12) relates to a signal filter considering the variance of an interference metric.

$$F_{3i} = R_{HH_i^P} W_i^H (W_i R_{H_i^P H_i^P} W_i^H + (\sigma_n^2 + \sigma_Z^2)I)^{-1} \qquad \text{eqn. (12)}$$

Here, $F_{3i}$ is a signal filter in accordance with the third algorithm, and $H_i^P = [H_i^P(0), \ldots H_i^P(L-1)]^T$ is a channel vector corresponding to the i-th port for the received reference signal. In addition, H is an estimation target channel, $R_{HH_k^p} R_{H_k^p H_k^p}$ are respectively H a cross-correlation of H and $H_k^p$, and, auto-correlation of $H_k^p$, $\sigma d_n^2$ is the variation of noise, and $\sigma_Z^2$ is the variance of the interference metric described in eqn. (9). When an interlayer interference filter is determined using eqn. (12), the receive channel may be estimated using eqn. (13):

$$\hat{H}_i = \tilde{Y} F_{3i} \quad \text{(eqn. 13)}$$

where $\tilde{Y} = [\tilde{Y}(0), \ldots \tilde{Y}(N-1)]^T$ is a receive signal and $\hat{H}_i$ is an estimated receive channel.

Figure 11:
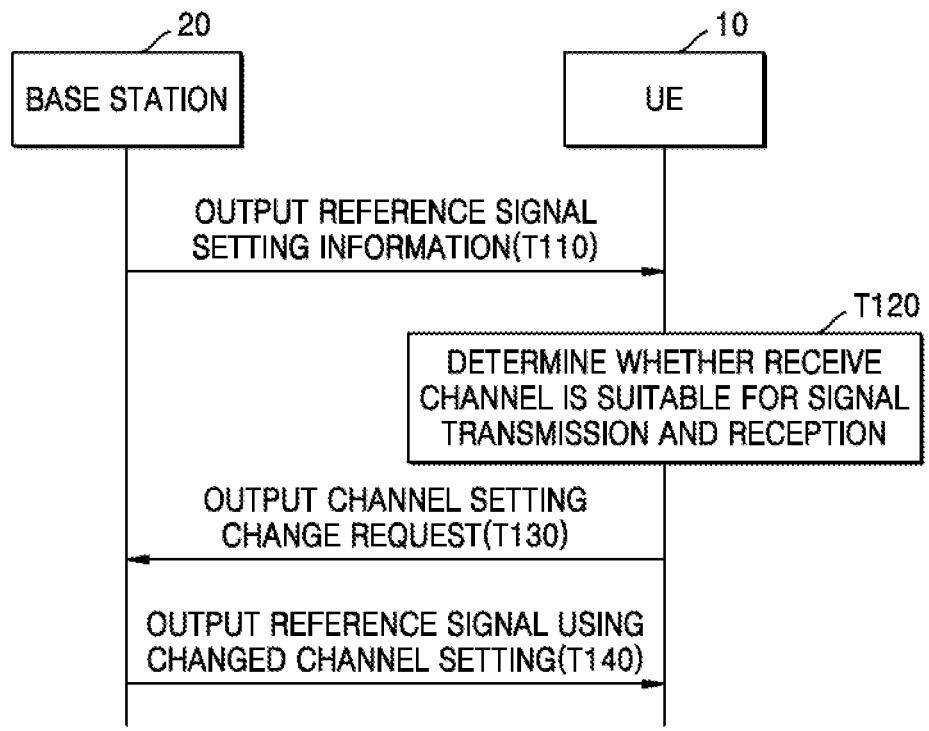
FIG. 11 is a diagram illustrating a method of operating a wireless communication system, according to an example embodiment.

FIG. 11 is a diagram illustrating a method of operating a wireless communication system, according to an example embodiment. In detail, FIG. 11 illustrates an embodiment in which a terminal outputs a channel setting change request.

Referring to FIG. 11, the wireless communication system may include the base station 20 and the terminal (or UE) 10. The base station 20 may output reference signal setting information to the terminal 10 in operation T110. The terminal 10 may determine whether a receive channel is suitable for signal transmission and reception based on the reference signal setting information in operation T120. In an embodiment, the terminal 10 may determine whether the receive channel is suitable for signal transmission and reception based on: a Doppler spread, a Doppler shift, an average delay, a delay spread, a data traffic pattern, and/or the reception performance of the terminal 10.

When the receive channel is unsuitable for signal transmission and reception, the terminal 10 may output a channel setting change request to the base station 20 in operation T130. The base station 20 may change channel setting in response to the channel setting change request and output a reference signal using the changed channel setting in operation T140. In an embodiment, the base station 20 may change a channel pattern in response to the channel setting change request. In an embodiment, the base station 20 may change the first channel pattern shown in FIG. 3A into the second channel pattern shown in FIG. 3B in response to the channel setting change request, or vice versa.

According to an embodiment, the terminal 10 may determine whether a receive channel is suitable for signal transmission and reception and output a change request for channel setting based on a determination result, and accordingly, the terminal 10 and the base station 20 may efficiently find channel setting suitable for signal transmission and reception and may smoothly perform the signal transmission and reception.

Figure 12:
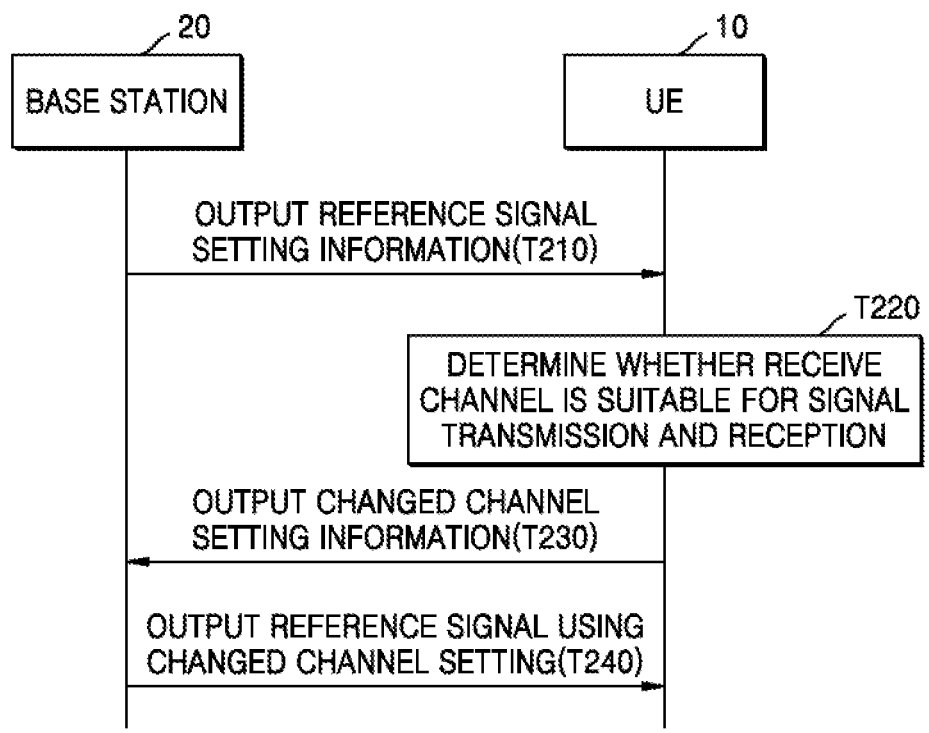
FIG. 12 is a diagram illustrating a method of operating a wireless communication system, according to an example embodiment.

FIG. 12 is a diagram illustrating a method of operating a wireless communication system, according to an example embodiment. In detail, FIG. 12 illustrates an embodiment in which a terminal outputs changed channel setting information. Redundant descriptions given with reference to FIG. 11 will be omitted.

Referring to FIG. 12, the wireless communication system may include the base station 20 and the terminal (or UE) 10. The base station 20 may output reference signal setting information to the terminal 10 in operation T210. The terminal 10 may determine whether a receive channel is suitable for signal transmission and reception based on the reference signal setting information in operation T220. When the receive channel is unsuitable for signal transmission and reception, the terminal 10 may output changed channel setting information to the base station 20 in operation T230. In an embodiment, the changed channel setting information may include information about a channel pattern. The base station 20 may change channel setting in response to the channel pattern included in the changed channel setting information and output a reference signal using the changed channel setting in operation T240.

Figure 13:
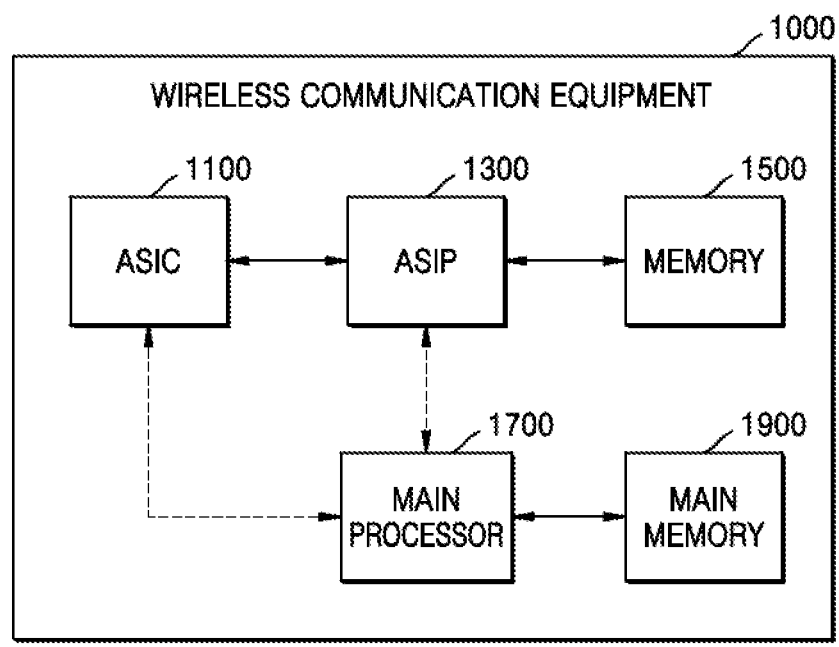
FIG. 13 is a block diagram of wireless communication equipment according to an example embodiment.

FIG. 13 is a block diagram of wireless communication equipment 1000 according to an example embodiment. Referring to FIG. 13, the wireless communication equipment 1000 may include an application specific integrated circuit (ASIC) 1100, an application specific instruction set processor (ASIP) 1300, a memory 1500, a main processor 1700, and a main memory 1900. At least two of the ASIC 1100, the ASIP 1300, and the main processor 1700 may communicate with each other. In addition, at least two of the ASIC 1100, the ASIP 1300, the memory 1500, the main processor 1700, and the main memory 1900 may be embedded in a single chip.

The ASIC 1100 is customized for a specific purpose and may include a radio-frequency integrated circuit (RFIC), a modulator, a demodulator, or the like. The ASIP 1300 may support an instruction set dedicated to a specific application and may execute an instruction included in the instruction set. The memory 1500 may communicate with the ASIP 1300 and may store a plurality of instructions, which are executed by the ASIP 1300, as a non-transitory storage device. The memory 1500 may also store data generated while instructions are being executed in the ASIP 1300. For example, the memory 1500 may include random access memory (RAM), read-only memory (ROM), tape, a magnetic disk, an optical disk, volatile memory, non-volatile memory, and/or a combination thereof. Besides the above, the memory 1500 may include any type of memory that is accessible by the ASIP 1300.

The main processor 1700 may control the wireless communication equipment 1000, e.g., UE, by executing instructions. For example, the main processor 1700 may control the ASIC 1100 and the ASIP 1300 and may process data received through a wireless communication network or a user input to the wireless communication equipment 1000. The main memory 1900 may communicate with the main processor 1700 and may store a plurality of instructions, which are executed by the main processor 1700, as a non-transitory storage device. For example, the main memory 1900 may include any type of memory, such as RAM, ROM, tape, a magnetic disk, an optical disk, volatile memory, non-volatile memory, or a combination thereof, which is accessible by the main processor 1700.

According to the embodiments described above, an element of a wireless communication device (e.g., the terminal 10 in FIG. 1 or the wireless communication device 100 of FIG. 2) or an operation included in a channel estimating method thereof may be included in at least one element of the wireless communication equipment 1000 of FIG. 13. For example, at least one selected from the interlayer interference detector 130 and the channel estimator 140 may be implemented by a plurality of instructions stored in the memory 1500. In an embodiment, at least one operation in the channel estimating method of FIG. 4 may be implemented by a plurality of instructions stored in the memory 1500.

When the ASIP 1300 executes a plurality of instructions stored in the memory 1500, the operation of at least one selected from the interlayer interference detector 130 and the channel estimator 140 or at least one operation in the channel estimating method may be performed. In another embodiment, at least one selected from the interlayer interference detector 130 and the channel estimator 140 in FIG. 1 or at least one operation in the channel estimating method may be implemented by a hardware block included in the ASIC 1100. In a further embodiment, at least one selected from the interlayer interference detector 130 and the channel estimator 140 in FIG. 1 or at least one operation in the channel estimating method may be implemented by a plurality of instructions stored in the main memory 1900. When the main processor 1700 executes instructions stored in the main memory 1900, the operation of the interlayer interference detector 130 and/or the channel estimator 140, or at least one operation in the channel estimating method may be performed.

While the inventive concept has been particularly shown and described with reference to embodiments thereof, it will be understood that various changes in form and details may be made therein without departing from the spirit and scope of the following claims.

What is claimed is:

1. A wireless communication device comprising:
an interlayer interference detector configured to receive a reference signal including a plurality of layers transmitted through a plurality of ports respectively connected to a plurality of antennas, and to determine whether interlayer interference occurs based on the reference signal; and
a channel estimator configured to estimate a channel matrix by executing an algorithm that is based on whether the interlayer interference occurs,
wherein the wireless communication device is configured to decode a receive signal based on the estimated channel matrix.

2. The wireless communication device of claim 1, wherein,
when the interlayer interference does not occur, the channel estimator estimates the channel matrix based on a variance of noise in the reference signal, without separating measurement results of different frequency channels of the plurality of layers from each other; and
when the interlayer interference occurs, the channel estimator separates the measurement results and estimates the channel matrix based on the separated measurement results.

3. The wireless communication device of claim 1,
wherein the reference signal is received through a first frequency channel and a second frequency channel of different respective carriers, and
the interlayer interference detector:
obtains a correlation value by performing a correlation on a first channel matrix corresponding to the first frequency channel and a second channel matrix corresponding to the second frequency channel, and
determines whether the interlayer interference occurs based on the correlation value and a first reference value.

4. The wireless communication device of claim 1, wherein the interlayer interference detector obtains a maximum delay spread for the reference signal and determines whether the interlayer interference occurs based on the maximum delay spread and a second reference value.

5. The wireless communication device of claim 1,
wherein the reference signal is received through a first frequency channel and a second frequency channel that respectively have different carriers, and
the interlayer interference detector generates an interference metric based on a difference between a first frequency channel receive signal received through the first frequency channel and a second frequency channel receive signal received through the second frequency channel and determines whether the interlayer interference occurs based on a normalized value of the interference metric and a third reference value.

6. The wireless communication device of claim 1,
wherein the plurality of ports include a first port connected to a first antenna and a second port connected to a second antenna, the reference signal includes a first port receive signal received through the first port and a second port receive signal received through the second port,
the interlayer interference detector generates an interference correlation value indicating a similarity between a data sequence of the first port receive signal and a data sequence of the second port receive signal, and
the channel estimator estimates the channel matrix by executing the algorithm based on whether the interlayer interference occurs and the interference correlation value.

7. The wireless communication device of claim 6, wherein,
when the interlayer interference does not occur, the channel estimator estimates the channel matrix based on a variance of noise in the reference signal, without separating results of different frequency channels of the plurality of layers from each other;
when the interlayer interference occurs and the interference correlation value is greater than a fourth reference value, the channel estimator separates the results of the frequency channels of the plurality of layers and estimates the channel matrix based on the separated results; and
when the interlayer interference occurs and the interference correlation value is not greater than the fourth reference value, the channel estimator estimates the channel matrix based on a variance of an interference metric corresponding to a difference between the first port receive signal and the second port receive signal.

8. A channel estimating method of a wireless communication device, the channel estimating method comprising:
receiving a reference signal including a plurality of layers transmitted through a plurality of ports respectively connected to a plurality of antennas;
determining whether interlayer interference occurs with respect to the reference signal;
estimating a channel by executing a first algorithm when it is determined that the interlayer interference does not occur; and
estimating the channel by executing a second algorithm different from the first algorithm when it is determined that the interlayer interference occurs.

9. The channel estimating method of claim 8,
wherein the reference signal is received through a first frequency channel and a second frequency channel that respectively have different carriers, and
the determining of whether the interlayer interference occurs comprises:
obtaining a correlation value by performing a correlation on a first channel matrix corresponding to the first frequency channel and a second channel matrix corresponding to the second frequency channel; and
determining whether the interlayer interference occurs based on the correlation value and a first reference value that is predetermined.

10. The channel estimating method of claim 9,
wherein the determining of whether the interlayer interference occurs based on the correlation value and the first reference value comprises:

comparing the correlation value with the first reference value; and determining that the interlayer interference occurs when the correlation value is less than the first reference value.

11. The channel estimating method of claim 8, wherein the determining of whether the interlayer interference occurs comprises:

obtaining a maximum delay spread for the reference signal; and determining whether the interlayer interference occurs based on the maximum delay spread and a second reference value that is predetermined.

12. The channel estimating method of claim 11, wherein the determining of whether the interlayer interference occurs based on the maximum delay spread and the second reference value comprises:

comparing the maximum delay spread with the second reference value; and determining that the interlayer interference occurs when the maximum delay spread is greater than the second reference value.

13. The channel estimating method of claim 8, wherein the reference signal is received through a first frequency channel and a second frequency channel that respectively have different carriers, and the determining of whether the interlayer interference occurs comprises:

generating an interference metric based on a difference between a first channel receive signal received through the first frequency channel and a second channel receive signal received through the second frequency channel; and determining whether the interlayer interference occurs based on a normalized value of the interference metric and a third reference value.

14. The channel estimating method of claim 13, wherein determining of whether the interlayer interference occurs based on the normalized value of the interference metric and the third reference value comprises:

comparing the normalized value with the third reference value; and determining that the interlayer interference occurs when the normalized value is greater than the third reference value.

15. The channel estimating method of claim 13, wherein the third reference value is determined based on a variance of noise occurring when the reference signal is received.

16. The channel estimating method of claim 8, further comprising estimating the channel based on a similarity between a data sequence of a first port receive signal and a data sequence of a second port receive signal, wherein the wireless communication device includes a first port connected to a first antenna and a second port connected to a second antenna, and the reference signal includes the first port receive signal received through the first port and the second port receive signal received through the second port.

17. The channel estimating method of claim 16, wherein the estimating of the channel based on the similarity between the data sequences is performed when it is determined that the interlayer interference occurs, and the estimating of the channel based on the similarity between the data sequences comprises:

determining whether the data sequence of the first port receive signal is identical to the data sequence of the second port receive signal based on an interference correlation value indicating the similarity between the data sequence of the first port receive signal and the data sequence of the second port receive signal;

estimating the channel based on the second algorithm when it is determined that the data sequence of the first port receive signal is identical to the data sequence of the second port receive signal; and estimating the channel based on a third algorithm different from the second algorithm when it is determined that the data sequence of the first port receive signal is not identical to the data sequence of the second port receive signal.

18. The channel estimating method of claim 17, wherein the determining of whether the data sequences are identical comprises:

generating the interference correlation value based on a difference between the first port receive signal and the second port receive signal;

comparing the interference correlation value with a fourth reference value that is predetermined; and determining that the data sequence of the first port receive signal is identical to the data sequence of the second port receive signal when the interference correlation value is greater than the fourth reference value.

19. The channel estimating method of claim 17, wherein the first algorithm estimates the channel, assuming that the interlayer interference does not occur;

the second algorithm estimates the channel, taking into account the interlayer interference; and the third algorithm estimates the channel based on a sum of a variance of noise in the reference signal and a variance of noise in the first port receive signal and the second port receive signal.

20. A wireless communication system comprising:

a base station configured to output reference signal setting information; and a terminal configured to determine whether a current channel matrix is suitable for signal transmission and reception based on the reference signal setting information and to output a channel setting change request to the base station when the current channel matrix is unsuitable for the signal transmission and reception, wherein in response to the channel setting change request, the base station changes a channel setting and outputs a reference signal using the changed channel setting, which comprises changing a channel pattern by changing a time duration between time slots at which the reference signal is transmitted.

21. The wireless communication system of claim 20, wherein the terminal determines whether the current channel matrix is suitable for the signal transmission and reception based on at least one of: a Doppler spread, a Doppler shift, an average delay and a delay spread.

* * * * *